(12) United States Patent
Gokhale

(10) Patent No.: US 11,646,411 B2
(45) Date of Patent: May 9, 2023

(54) LITHIUM-FREE ANODE WITH ORGANIC ISLANDS AND BATTERY INCLUDING SAME

(71) Applicant: Nissan North America, Inc., Franklin, TN (US)

(72) Inventor: Rohan Gokhale, Northville, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 358 days.

(21) Appl. No.: 16/941,443

(22) Filed: Jul. 28, 2020

(65) Prior Publication Data

US 2022/0037647 A1   Feb. 3, 2022

(51) Int. Cl.

| | | |
|---|---|---|
| *H01M 4/36* | (2006.01) | |
| *H01M 4/66* | (2006.01) | |
| *H01M 4/38* | (2006.01) | |
| *H01M 4/587* | (2010.01) | |
| *H01M 4/62* | (2006.01) | |
| *H01M 4/133* | (2010.01) | |
| *H01M 10/0525* | (2010.01) | |
| *H01M 4/02* | (2006.01) | |

(52) U.S. Cl.
CPC .......... *H01M 4/366* (2013.01); *H01M 4/133* (2013.01); *H01M 4/38* (2013.01); *H01M 4/587* (2013.01); *H01M 4/625* (2013.01); *H01M 4/661* (2013.01); *H01M 10/0525* (2013.01); *H01M 2004/021* (2013.01); *H01M 2004/027* (2013.01)

(58) Field of Classification Search
CPC ........ H01M 4/366; H01M 4/133; H01M 4/38; H01M 4/587; H01M 4/625; H01M 4/661; H01M 10/0525; H01M 2004/021; H01M 2004/027
See application file for complete search history.

(56) References Cited

U.S. PATENT DOCUMENTS

2020/0152974 A1* 5/2020 Mason ................ H01M 4/366
2022/0223829 A1* 7/2022 Biton ................ H01M 10/4207

OTHER PUBLICATIONS

Chen, Ke, et al. "A copper-clad lithiophilic current collector for dendrite-free lithium metal anodes." Journal of Materials Chemistry A 8.4 (2020): 1911-1919. (Year: 2019).*
Yang, Guanhui, et al. "Graphene anchored on Cu foam as a lithiophilic 3D current collector for a stable and dendrite-free lithium metal anode." Journal of Materials Chemistry A 6.21 (2018): 9899-9905.) (Year: 2018).*

(Continued)

*Primary Examiner* — William E McClain
*Assistant Examiner* — Jason Barton
(74) *Attorney, Agent, or Firm* — Global IP Counselors, LLP

(57) ABSTRACT

A lithium-free anode having organic islands on a layer of graphene is provided. The lithium-free anode includes a current collector, a three-dimensional carbon lattice formed on the current collector, a first layer formed on the carbon lattice, a second layer formed on the first layer, and organic molecules formed on the second layer. The first layer includes copper, and the second layer includes graphene. The organic molecules are spaced apart from each other on the second layer.

20 Claims, 3 Drawing Sheets

(56) References Cited

OTHER PUBLICATIONS

Mukherjee, Debdyuti, et al. "Porous, hyper-cross-linked, three-dimensional polymer as stable, high rate capability electrode for lithium-ion battery." ACS applied materials & interfaces 9.23 (2017): 19446-19454. (Year: 2017).*
• Sun, Yubao, et al. "A hyperbranched conjugated Schiff base polymer network: a potential negative electrode for flexible thin film batteries." Chemical communications 52.14 (2016): 3000-3002. (Year: 2016).*
• Xie, Jian, et al. "Novel conjugated ladder-structured oligomer anode with high lithium storage and long cycling capability." ACS applied materials & interfaces 8.26 (2016): 16932-16938. (Year: 2016).*
• Meng, Lingkun, et al. "Synthesis of a 2D nitrogen-rich π-conjugated microporous polymer for high performance lithium-ion batteries." Chemical Communications 55.64 (2019): 9491-9494. (Year: 2019).*
Yang C et al., "Accommodating lithium into 3D current collectors with a submicron skeleton towards long-life lithium metal anodes", Nature Communications, Aug. 24, 2015, pp. 1-9, Macmillan Publishers Limited.
Assegie A et al., "Multilayer-graphene-stabilized lithium deposition for anode-Free lithium-metal batteries", Nanoscale, Jan. 9, 2019, pp. 2710-2720, The Royal Society of Chemistry.

* cited by examiner

LITHIUM-FREE ANODE WITH ORGANIC ISLANDS AND BATTERY INCLUDING SAME

BACKGROUND

Technical Field

The present invention generally relates to a lithium-free anode for a battery. More specifically, the present invention relates to a lithium-free anode that includes a three-dimensional carbon lattice structure formed on a current collector, a layer of copper formed on the carbon lattice structure, a layer of graphene formed on the copper layer, and organic islands formed on the graphene layer.

Background Information

Conventional lithium ion batteries suffer from dendrite formation due to the uneven deposition of lithium on the surface of the anode during cycling. As a result, conventional lithium ion batteries have low cyclability caused by the short circuit of the cells due to dendrite formation.

SUMMARY

It has been discovered that use of a lithium-free anode having organic islands on a surface of a graphene layer can improve the distribution of lithium on the surface of the anode and, thereby, decrease the formation of lithium dendrites.

In particular, it has been discovered that certain large organic n-type molecules bind to a layer of graphene at intervals such that "islands" of the organic molecules are formed. The organic molecules that bind to the graphene are spaced apart from each other and do not form a continuous layer.

It has been further discovered that these large organic n-type molecules can accommodate lithium ions that flow to an anode from a cathode containing a lithium material. Therefore, the large organic n-type molecules allow the lithium ions to be distributed more uniformly on the surface of an anode when the graphene layer is formed on a three-dimensional carbon lattice having a layer of copper between the lattice and the graphene layer. Therefore, it is desirable to provide a lithium-free anode that includes such organic islands on a three-dimensional carbon lattice having a high surface area and covered with layers of copper and graphene. It is also desirable to provide a battery containing such a lithium-free anode.

In view of the state of the known technology, one aspect of the present disclosure is to provide a lithium-free anode. The lithium-free anode includes a current collector, a three-dimensional carbon lattice structure disposed on a surface of the current collector, a first layer disposed on the three-dimensional carbon lattice structure, a second layer disposed on the first layer, and organic molecules disposed on the second layer. The first layer includes copper, and the second layer includes graphene.

Another aspect of the present disclosure is to provide a battery including a cathode, a lithium-free anode, and an electrolyte disposed between the cathode and the lithium-free anode. The cathode includes a material containing lithium. The lithium-free anode includes a current collector, a three-dimensional carbon lattice structure disposed on the current collector, a first layer disposed on the three-dimensional carbon lattice structure, and a second layer disposed on the first layer. The first layer includes copper, and the second layer includes graphene.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
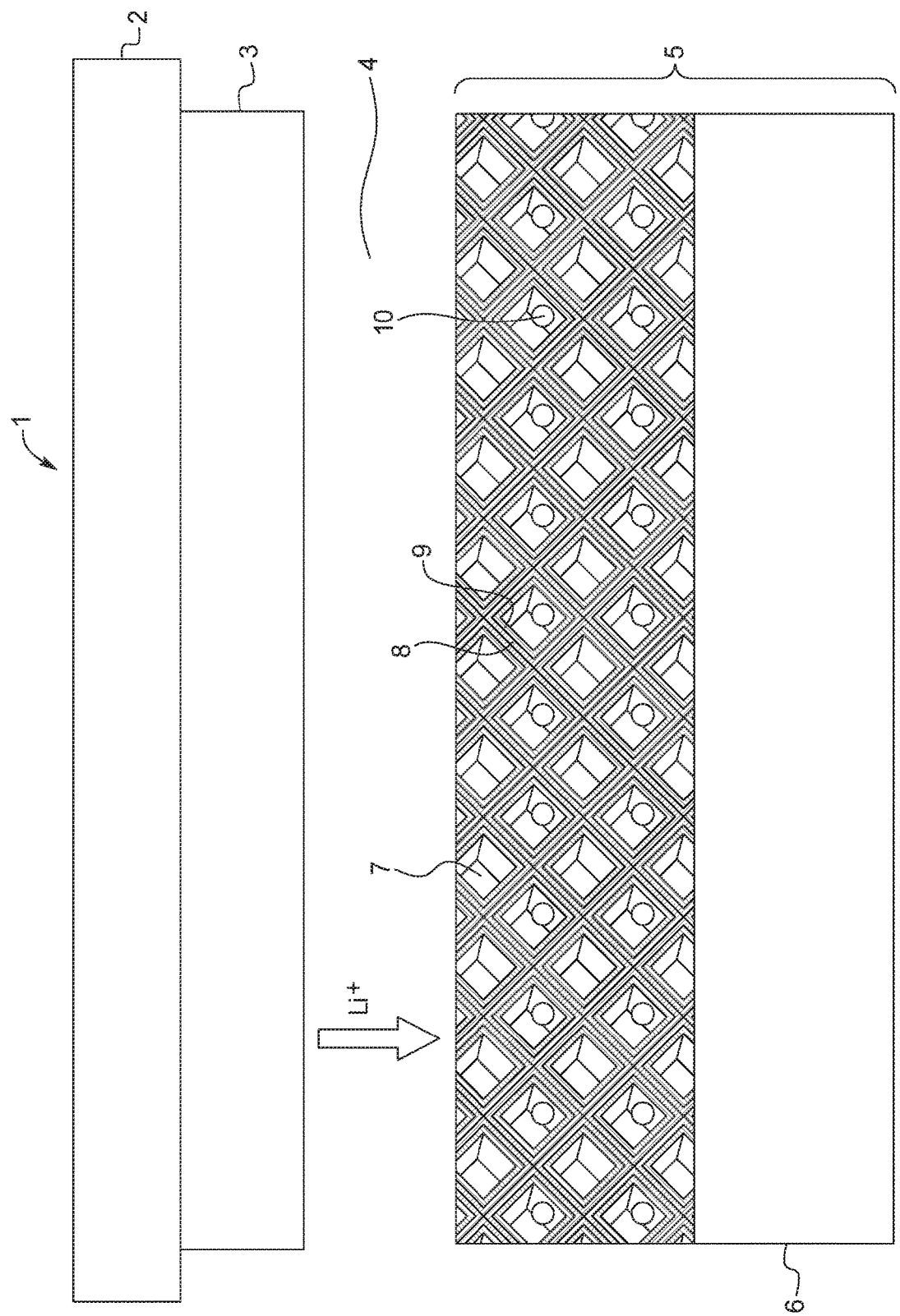
FIG. 1 is a schematic view of a battery including a lithium-free anode according to an embodiment.

Referring initially to FIG. 1, a lithium ion battery 1 is illustrated that includes a cathode current collector 2, a cathode 3, an electrolyte 4, and an anode 5 in accordance with a first embodiment. The lithium ion battery 1 is rechargeable and can be incorporated in a vehicle, a mobile device, a laptop computer or other suitable portable electronic devices.

The cathode current collector 2 is formed of a metal material. The metal material can be any suitable metal material for a current collector. For example, the cathode current collector 2 may be formed of aluminum or copper.

The cathode 2 includes a cathode active material. The cathode 2 can also include an additive and a binder. The cathode active material can be any suitable cathode active material that contains lithium ions. For example, the cathode active material can include a lithium metal oxide containing at least one of nickel, cobalt or manganese, such as lithium cobalt oxide ($LiCoO_2$), lithium manganese oxide ($LiMn_2O_4$), lithium manganese nickel oxide ($LiMn_{1.5}Ni_{0.5}O_4$), a lithium phosphate such as lithium iron phosphate ($LiFePO_4$), and any combination thereof. The cathode active material can also include a material comprising at least one of nickel, cobalt or manganese. For example, the cathode active material can include an oxide of at least one of nickel, cobalt or manganese, such as manganese dioxide or nickel manganese oxide. The cathode active material preferably includes sulfur.

The binder can be any suitable electrode binder material. For example, the binder can include polyvinylidene fluoride, styrene-butadiene rubber, a cellulose material or any combination thereof. The additive can be any suitable electrode additive, such as a carbon material or a conductive metal, and preferably includes a carbon material.

The electrolyte 4 can be any suitable liquid, gel or solid electrolyte that conducts lithium ions and is compatible with the lithium-free anode. For example, the electrolyte 4 can be a nonaqueous liquid electrolyte, such as lithium hexafluorophosphate ($LiPF_6$) or lithium perchlorate ($LiClO_4$), a gel electrolyte containing a polymer, or a solid electrolyte containing sulfur or a polymer.

The anode 5 is a lithium-free anode that is not formed of any materials containing lithium. The lithium-free anode 5 includes an anode current collector 6, a three-dimensional carbon lattice 7, a copper layer 8 formed on the surface of the carbon lattice 7, a graphene layer 9 formed on the surface of the copper layer 8, and organic islands 10 formed on the surface of the graphene layer 9.

The anode current collector 6 is formed of a metal material. The metal material can be any suitable metal material for a current collector. For example, the anode current collector 6 is formed of copper.

The three-dimensional carbon lattice 7 is a highly porous sponge-like network of carbon atoms. For example, the carbon lattice 7 has a porosity of greater than or equal to 50%. The three-dimensional carbon lattice 7 has a high surface area of 400 m²/g or more. The carbon in the carbon lattice 7 may be in the form of carbon nanotubes, graphene or amorphous carbon.

The carbon lattice 7 has a sponge-like structure with a wide distribution of pore sizes. The regular lattice structure shown in FIG. 1 is a schematic depiction of the sponge-like carbon network in the lattice 7. However, in an alternative embodiment, the lattice 7 has a somewhat irregular structure. The lattice structure 7 includes pores of micro pores, meso pores and macro pores. For example, the carbon lattice includes micro pores having a size of less than 2 nm, meso pores having a size ranging from 2 nm to 20 nm, and macro pores having a size greater than 20 nm.

The copper layer 8 is formed as a coating on the surface of the carbon lattice 7 as shown in FIG. 1. The copper layer 8 is ultra thin. For example, the copper layer 8 has a thickness ranging from 1 nm to 50 nm, and preferably ranging from 1 nm to 20 nm. The copper atoms in the copper layer 8 penetrate into the pores, specifically the macro pores, of the carbon lattice 7.

The graphene layer 9 is formed on the copper layer 8 on the carbon lattice 7. The graphene layer 9 is very thin. For example, the graphene layer 9 has a thickness of 10 nm or less. The graphene layer 9 can be formed of any suitable graphene material that can be formed into a thin layer having a thickness of 10 nm or less.

The organic molecules 10 have a size of 50 nm or less and bind to the graphene layer 9 at intervals, rather than forming a continuous layer on the graphene. The organic molecules 10 are distributed approximately uniformly across of the surface of the graphene layer 9. The organic molecules 10 can be any suitable organic molecules that form a pi-pi interaction with graphene and are capable of storing lithium ions. For example, the organic molecules 10 are n-type organic molecules with n-type functional groups or moieties that can accommodate lithium ions on the surface of a graphene nanostructure.

In particular, the organic molecules 10 can include poly (dihydroanthracene succinic anhydride), (4,4',4"-nitrilotribenzaldehyde-co-p-phenylenediamine), nitrogen-rich graphene-like holey conjugated polymers, poly(1,4-dihydro-11H-pyrazino [2',3':3,4] cyclopenta [1,2-b] quinoxaline-11-one, poly(1,6-dihydropyrazino [2,3g] quinoxaline-2, 3,8-triyl-7-(2H)-ylidene-7,8-dimethylidene, and mixtures thereof.

For example, poly(dihydroanthracene succinic anhydride) ("PDASA") having the following formula may be suitable for use as the organic molecules 10:

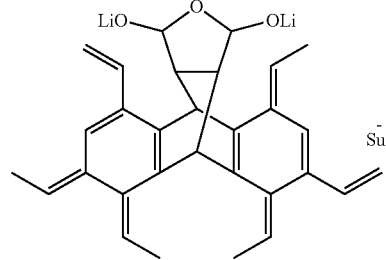

A Schiff base electrode film (4,4',4"-nitrilotribenzaldehyde-co-p-phenylenediamine) having the following formula may also be suitable for use as the organic molecules 10:

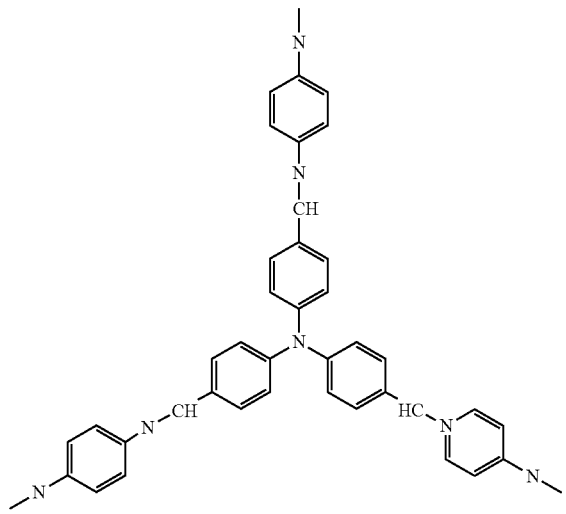

Nitrogen-rich graphene-like holey conjugated polymers having the following formula may be suitable for use as the organic molecules 10:

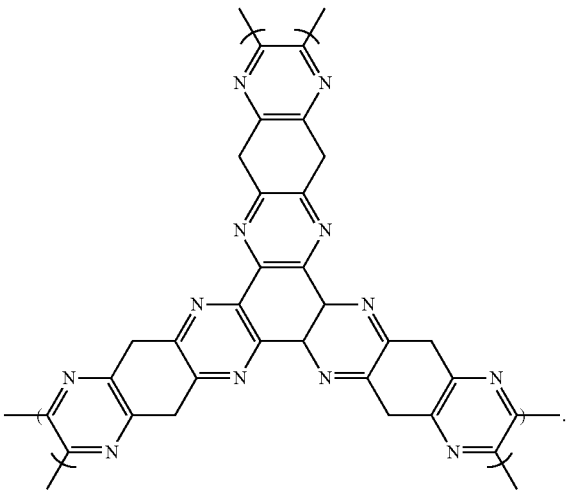

In addition, poly(1,4-dihydro-11H-pyrazino [2',3':3,4] cyclopenta [1,2-b] quinoxaline-11-one having the following formula may be suitable for use as the organic molecules 10:

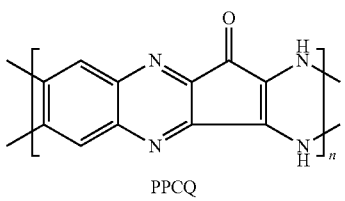

PPCQ

Poly(1,6-dihydropyrazino [2,3g] quinoxaline-2,3,8-triyl-7-(2H)-ylidene-7,8-dimethylidene having the following formula may also be suitable for use as the organic molecules 10:

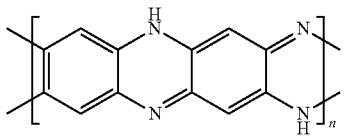

Because the organic molecules 10 are distributed at intervals on the surface of the graphene and can accommodate lithium ions, the organic molecules 10 allow lithium to deposit more uniformly on the outermost surface of the anode that faces the cathode. As a result, dendrite formation can be decreased and the cyclability of the lithium ion battery can be improved.

Figure 2:
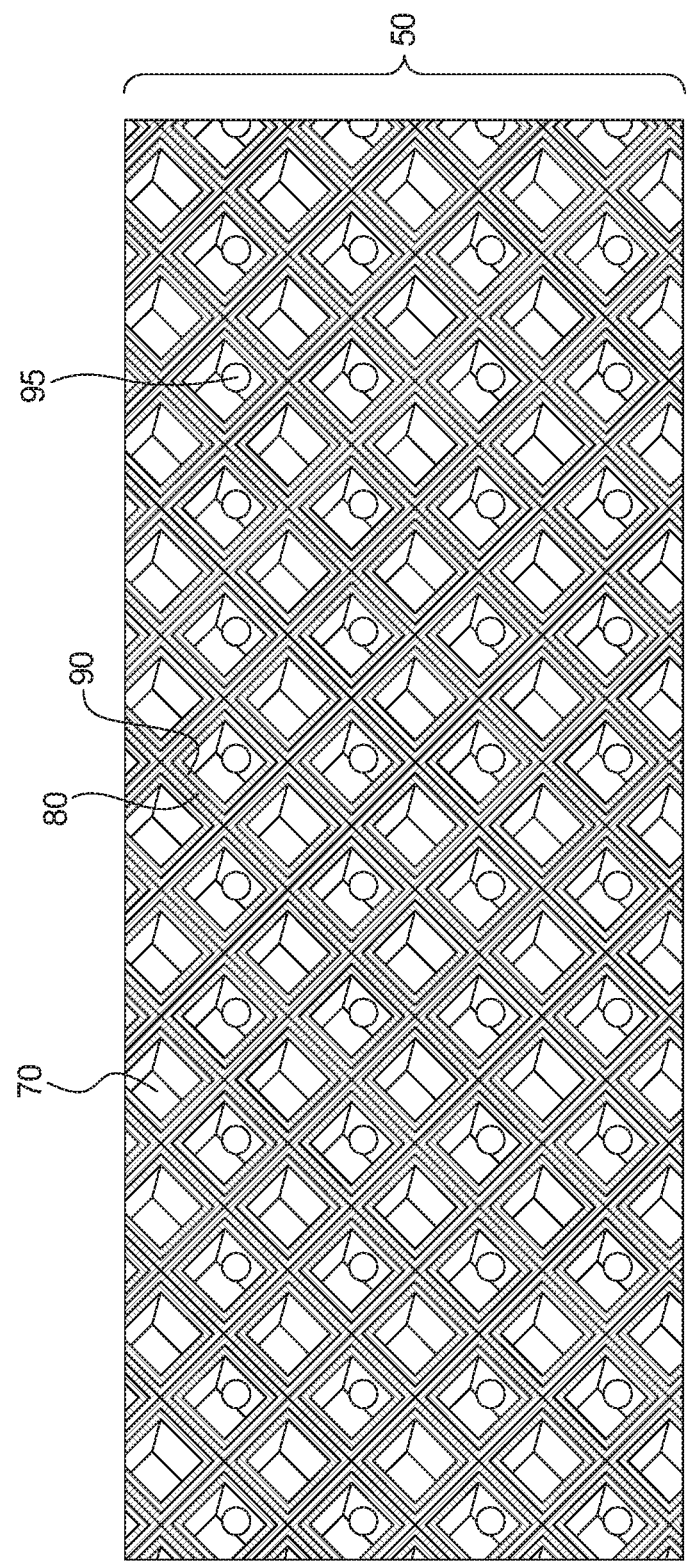
FIG. 2 is a schematic view of a lithium-free anode according to an embodiment.

FIG. 2 shows a schematic view of an anode 50 in accordance with a second embodiment. The anode 50 is a lithium-free anode that is not formed of any materials containing lithium. The lithium-free anode 50 includes an anode current collector 60, a three-dimensional carbon lattice 70, a copper layer 80 formed on the surface of the carbon lattice 70, a graphene layer 90 formed on the surface of the copper layer 80, and organic islands 95 formed on the surface of the graphene layer 90.

As in the first embodiment, the anode current collector 60 is formed of a suitable metal material such as copper.

As shown in FIG. 2, the three-dimensional carbon lattice 70 is a highly porous sponge-like network of carbon atoms. For example, the carbon lattice 70 has a porosity of greater than or equal to 50%. The three-dimensional carbon lattice 70 also has a high surface area of 400 $m^2/g$ or more.

The carbon lattice 70 has a sponge-like structure with a wide distribution of pores. The regular lattice structure shown in FIG. 2 is a schematic depiction of the sponge-like carbon network in the lattice 70. However, in an alternative embodiment, the lattice 70 has a somewhat irregular structure. The lattice structure 70 includes micro pores having a size of less than 2 nm, meso pores having a size ranging from 2 nm to 20 nm, and macro pores having a size greater than 20 nm. The carbon in the carbon lattice 70 may be in the form of carbon nanotubes, graphene or amorphous carbon.

The copper layer 80 is formed as a coating on the surface of the carbon lattice 70 as shown in FIG. 2. The copper layer 8 is ultra thin with a thickness ranging from 1 nm to 50 nm, and preferably ranging from 1 nm to 20 nm. The copper atoms in the copper layer 80 penetrate into the pores, specifically the macro pores, of the carbon lattice 70.

The graphene layer 90 is formed on the copper layer 80 on the carbon lattice 70. The graphene layer 90 is very thin and has a thickness of 10 nm or less. The graphene layer 90 can be formed of any suitable graphene material that can be formed into a layer having a thickness of 10 nm or less.

The organic molecules 95 have a size of 50 nm or less and bind to the graphene layer 95 at intervals, rather than forming a continuous layer on the graphene. The organic molecules 95 are distributed approximately uniformly across of the surface of the graphene layer 90. The organic molecules 95 can be any suitable organic molecules that form a pi-pi interaction with graphene and are capable of storing lithium ions. For example, the organic molecules 95 are n-type organic molecules with n-type functional groups or moieties that can accommodate lithium ions on the surface of a graphene nanostructure.

In particular, the organic molecules 95 can include poly (dihydroanthracene succinic anhydride), (4,4',4"-nitrilotribenzaldehyde-co-p-phenylenediamine), nitrogen-rich graphene-like holey conjugated polymers, poly(1,4-dihydro-11H-pyrazino [2',3':3,4] cyclopenta [1,2-b] quinoxaline-11-one, poly(1,6-dihydropyrazino [2,3g] quinoxaline-2,3,8-triyl-7-(2H)-ylidene-7,8-dimethylidene, and mixtures thereof.

Figure 3:
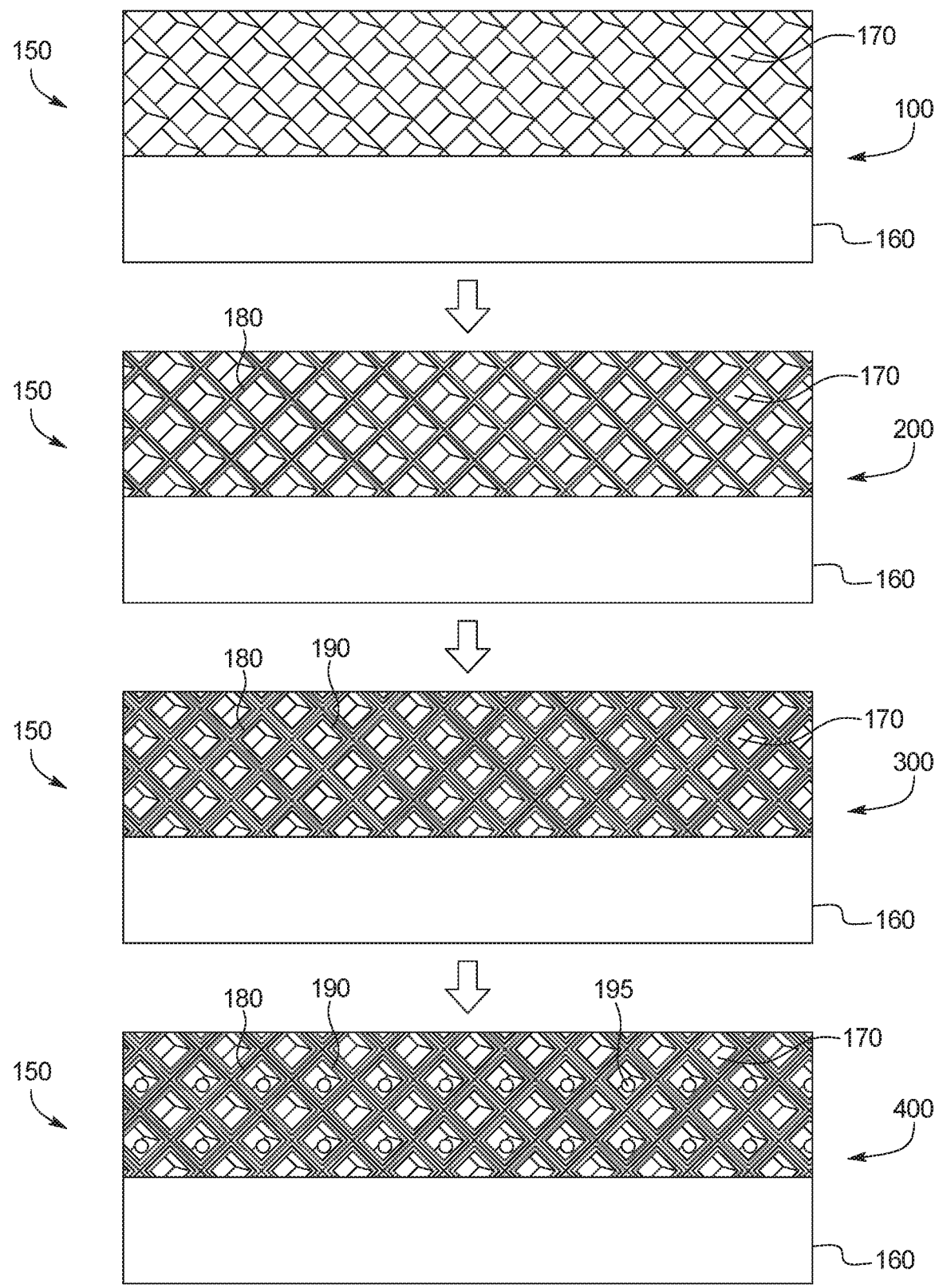
FIG. 3 is an illustrated flow chart showing a method of producing a battery including a lithium-free anode according to an embodiment.

FIG. 3 illustrates a process of producing a lithium-free anode 150 according to an embodiment. In Step 100, a three-dimensional carbon lattice structure 170 is formed on a metal current collector 160. The current collector 160 can be any suitable metal anode current collector. For example, the current collector 160 is a bare copper current collector.

The three-dimensional carbon lattice 170 is formed on the current collector 160 by any suitable process. For example, the carbon lattice 170 may be formed by any suitable physical or chemical deposition technique, such as chemical vapor deposition, pulsed laser deposition, or atomic layer deposition.

The three-dimensional carbon lattice 170 is a highly porous sponge-like network of carbon atoms. For example, the carbon lattice 170 has a porosity of greater than or equal to 50%. The three-dimensional carbon lattice 170 has a high surface area of 400 $m^2/g$ or more. The carbon in the carbon lattice 170 may be in the form of carbon nanotubes, graphene or amorphous carbon.

The carbon lattice 170 has a sponge-like structure with a wide distribution of pore sizes. The regular lattice structure shown in FIG. 3 is a schematic depiction of the sponge-like carbon network in the lattice 170. However, in an alternative embodiment, the lattice 170 has a somewhat irregular structure. The lattice structure 170 includes micro pores having a size of less than 2 nm, meso pores having a size ranging from 2 nm to 20 nm, and macro pores having a size greater than 20 nm In Step 200, a thin copper layer 180 is formed as a coating on the surface of the carbon lattice 170. The copper layer 180 has a thickness ranging from 1 nm to 50 nm, and preferably ranging from 1 nm to 20 nm.

The copper layer 180 may be formed by any suitable chemical or physical deposition method that allows formation of a thin layer having a thickness of 1 nm to 50 nm. The copper layer 180 is formed so that the copper atoms in the copper layer 180 penetrate into the pores, specifically the macro pores, of the carbon lattice 170.

In Step 300, an ultra thin graphene layer 190 is formed on top of the copper layer 180 on the carbon lattice 170. The graphene layer 190 is very thin and has a thickness of 10 nm or less. The graphene layer 190 can be formed of any suitable graphene material that can be formed into a thin layer having a thickness of 10 nm or less.

The graphene layer 190 is formed by any suitable vapor deposition method. Physical or chemical deposition of the graphene layer 190 is not suitable, as such deposition does not result in a layer having the required thickness of 10 nm or less. Furthermore, the graphene in the graphene layer 190 cannot be chemically produced, since the graphene layer 190 must have a thickness of 10 nm or less.

Organic molecules 195 are then bound to the graphene layer 190 in Step 400. The organic molecules 195 have a size of 50 nm or less and bind to the graphene layer 190 at intervals, rather than forming a continuous layer on the graphene. The organic molecules 195 are distributed approximately uniformly across of the surface of the graphene layer 190. The organic molecules 195 can be any suitable organic molecules that form a pi-pi interaction with graphene and are capable of storing lithium ions. For example, the organic molecules 195 are n-type organic molecules with n-type functional groups or moieties that can accommodate lithium ions on the surface of a graphene nanostructure.

In particular, the organic molecules 195 can include poly(dihydroanthracene succinic anhydride), (4,4',4"-nitrilotribenzaldehyde-co-p-phenylenediamine), nitrogen-rich graphene-like holey conjugated polymers, poly(1,4-dihydro-11H-pyrazino [2',3':3,4] cyclopenta [1,2-b] quinoxaline-11-one, poly(1,6-dihydropyrazino [2,3g] quinoxaline-2,3,8-triyl-7-(2H)-ylidene-7,8-dimethylidene, and mixtures thereof.

The organic molecules 195 are formed on the graphene layer 190 by any suitable method. For example, the organic islands 195 may be solution casted on the surface of the graphene layer 190 by drop casting a solution or dispersion onto the surface of the graphene layer 190. The organic islands 195 can also be deposited on the graphene layer 190 by chemical vapor deposition. The organic molecules 195 are formed such that they are separated from each other and do not form a continuous layer on the graphene.

General Interpretation of Terms

In understanding the scope of the present invention, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the battery field from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lithium-free anode comprising:
   a current collector;
   a three-dimensional carbon lattice structure disposed on a surface of the current collector;
   a first layer comprising copper disposed on a surface of the three-dimensional carbon lattice structure;
   a second layer comprising graphene disposed on a surface of the first layer; and
   organic molecules disposed on a surface of the second layer.

2. The lithium-free anode according to claim 1, wherein the current collector is formed of copper.

3. The lithium-free anode according to claim 1, wherein the organic molecules are disposed apart from each other on the surface of the second layer such that the organic molecules do not form a continuous layer.

4. The lithium-free anode according to claim 3, wherein the organic molecules are distributed at regular intervals on the surface of the second layer.

5. The lithium-free anode according to claim 1, wherein the organic molecules comprise n-type functional groups.

6. The lithium-free anode according to claim 5, wherein the organic molecules are selected from the group consisting of: poly(dihydroanthracene succinic anhydride); poly(4,4',4"-nitrilotribenzaldehyde-co-p-phenylenediamine); nitrogen-rich graphene-like holey conjugated polymers; poly(1,4-dihydro-11H-pyrazino [2',3':3,4] cyclopenta [1,2-b] quinoxaline-11-one; poly(1,6-dihydropyrazino [2,3g] quinoxaline-2,3,8-triyl-7-(2H)-ylidene-7,8-dimethylidene; and mixtures thereof.

7. The lithium-free anode according to claim 1, wherein the first layer has a thickness of 1 nm to 50 nm.

8. The lithium-free anode according to claim 1, wherein the second layer has a thickness of 10 nm or less.

9. The lithium-free anode according to claim 1, wherein the three-dimensional carbon lattice structure has a surface area greater than or equal to 400 $m^2/g$.

10. The lithium-free anode according to claim 1, wherein the three-dimensional carbon lattice structure has a porosity greater than or equal to 50%.

11. The lithium-free anode according to claim 1, wherein the three-dimensional carbon lattice structure comprises micro pores having a size of less than 2 nm, meso pores having a size of 2 nm to 20 nm, and macro pores having a size greater than 20 nm.

12. A battery comprising
a cathode comprising a material containing lithium;
a lithium-free anode; and
an electrolyte disposed between the cathode and the lithium-free anode,
the lithium-free anode comprising:
   a current collector;
   a three-dimensional carbon lattice structure disposed on a surface of the current collector;
   a first layer comprising copper disposed on a surface of the three-dimensional carbon lattice structure;
   a second layer comprising graphene disposed on a surface of the first layer; and
   organic molecules disposed on a surface of the second layer.

13. The battery according to claim 12, wherein the current collector is formed of copper.

14. The battery according to claim 12, wherein the organic molecules are disposed apart from each other on the surface of the second layer such that the organic molecules do not form a continuous layer.

15. The battery according to claim 12, wherein the organic molecules comprise n-type functional groups.

16. The battery according to claim 15, wherein the organic molecules are selected from the group consisting of: poly(dihydroanthracene succinic anhydride); poly(4,4',4"-nitrilotribenzaldehyde-co-p-phenylenediamine); nitrogen-rich graphene-like holey conjugated polymers; poly(1,4-dihydro-11H-pyrazino [2',3':3,4] cyclopenta [1,2-b] quinoxaline-11-one; poly(1,6-dihydropyrazino [2,3g] quinoxaline-2,3,8-triyl-7-(2H)-ylidene-7,8-dimethylidene; and mixtures thereof.

17. The battery according to claim 12, wherein the first layer has a thickness of 1 nm to 50 nm.

18. The battery according to claim 12, wherein the second layer has a thickness of 10 nm or less.

19. The battery according to claim 12, wherein the three-dimensional carbon lattice structure has a surface area greater than or equal to $400 \text{ m}^2/\text{g}$.

20. The battery according to claim 12, wherein the three-dimensional carbon lattice structure has a porosity greater than or equal to 50%.

* * * * *